United States Patent [19]
Jaffa

[11] 3,795,189
[45] Mar. 5, 1974

[54] SCREEN PRINTING MACHINE WITH OVAL RAIL FOR INDEXING PALLETS

[75] Inventor: David Jaffa, Fairlawn, N.J.

[73] Assignee: Precision Screen Machines Inc., Hawthorne, N.J.

[22] Filed: Sept. 28, 1972

[21] Appl. No.: 292,860

[52] U.S. Cl................ 101/123, 101/35, 101/126, 198/181
[51] Int. Cl................... B41l 13/16, B41f 15/10
[58] Field of Search ..... 101/35, 114, 115, 123, 124, 101/126; 198/181

[56] References Cited
UNITED STATES PATENTS

| | | | |
|---|---|---|---|
| 2,613,595 | 10/1952 | Weldon | 101/115 |
| 2,745,542 | 5/1956 | Boots | 198/181 X |
| 3,166,011 | 1/1965 | Landsman | 101/123 |
| 2,057,950 | 10/1936 | Howison | 198/181 |
| 2,183,223 | 12/1939 | Mankin et al. | 101/124 |

Primary Examiner—Clyde I. Coughenour

[57] ABSTRACT

This disclosure is directed to a screen printing machine having an oval track or rail about which a series of pallets supporting a work piece are indexed from station to station. The arrangement is such that the pallets travelling about the oval rail are always disposed or maintained in a common plane. A printing head assembly having one or more color stations is operatively associated for movement into and out of printing relationship with one or more of the pallets as the pallets are indexed and maintained in a common plane.

12 Claims, 9 Drawing Figures

SCREEN PRINTING MACHINE WITH OVAL RAIL FOR INDEXING PALLETS

PROBLEM AND PRIOR ART

Heretofore in pallet screen printing machines the pallets were operatively connected to a conveyor means or driving chain so that pallets traveled on an endless path in spaced upper and lower flights. As a result, relatively complex structure was required at the respective ends of the endless conveyor or driving chains to maintain the respective pallets horizontal as they rounded the ends of the conveyor or chain in moving about the endless path. It has also been observed that the returning pallets travelling along the lower flight of the endless conveyor were rendered virtually inoperative as an operating station. For this reason twice as many pallets were required than were otherwise necessary for economically performing a printing operation because the returning pallets along the lower flight could not be practically utilized. Therefore the known pallet machines required costly and complex structure, resulting in greatly increased overall costs without any increase in production. Also such machines required a considerable amount of floor space.

OBJECTS

An object of this invention is to provide a screen printing machine having a minimum number of pallets travelling in a common plane whereby the rate of production can be maintained comparable to machines having twice the number of pallets travelling in endless superposed flights.

Another object is to provide a pallet screen printing machine which is relatively simple in construction, inexpensive to fabricate, and which is positive in operation.

Another object is to provide a screen printing machine having a series of pallets moving in a common plane about an endless oval path.

Another object is to provide a pallet screen printing machine wherein one or more color printings of a workpiece can be attained.

Another object is to provide a pallet screen printing machine having printing head extending over one or more of a plurality of pallets travelling in a common plane about an endless path.

BRIEF SUMMARY OF THE INVENTION

The foregoing objects and other features and advantages of this invention are attained by a supporting frame means having mounted thereon an oval rail or track wherein the plane of the oval rail is horizontally disposed. A plurality of pallets are circumferentially spaced about the oval rail and they are interconnected by a flexible drive member by which they are indexed about the rail from station to station.

A printing head assembly is pivotally connected on the frame means to overlie one or more of the pallets and is mounted for movement between a printing and non-printing position relative to the one or more pallets. The printing head includes a head frame for supporting a printing screen in position relative to a work piece to be printed supported on the pallets. A squeegee carriage carrying a squeegee and a flood bar is movably mounted on the head frame for transversing a printing stroke when the head assembly is disposed in an operative printing position and a flood stroke when the head assembly is in the inoperative non-printing position. The printing screen is supported in a screen holder which is operatively connected to the head frame to provide for limited lost motion therebetween as the printing head assembly is moved between operative and inoperative positions.

Operatively connected to the head frame of the head assembly are one or more locating bars which are cooperatively associated with the pallets so as to insure proper registration of the pallets when the printing head assembly is disposed in printing position.

The drive means for the respective pallets includes the flexible drive member which is suitably threaded about a sprocket journalled on a main drive shaft which is coupled in driving relationship to a drive motor. Operatively associated with the drive means is an indexing means in the form of a ram stop and cooperating cam follower which operates to effect an intermittent indexing of the respective pallets from station to station during machine operation.

FEATURES

A feature of this invention resides in the provision of a screen printing machine having a plurality of pallets travelling in a common plane about an oval rail and having a printing head assembly mounted for movement between a printing and non-printing position cooperatively associated with one or more of the respective pallets.

Another feature of this invention resides in the provision of an oval track pallet screen printing machine having a movable printing head assembly and locating means operatively associated therewith for effecting proper registration of the pallets in the printing position of the head assembly.

Another feature of this invention resides in the provision of a pallet screen printing machine constructed so as to provide for maximum production with the use of a minimum number of pallets.

Another feature resides in the provision of a screen printing machine having a plurality of pallets arranged to be indexed in a common plane about an endless path and having a pivoting printing head assembly arranged to be moved into and out of printing relationship with one or more of the pallets in a printing station and having cooperatively associated therewith locating means to insure proper registration of the pallets in printing position.

Another feature of this invention reside in the provision of a drive mechanism operatively associated with an indexing means to provide intermittent movement of the respective pallets about the oval rail.

Other features and advantages will become more readily apparent when considered in view of the drawing and following detailed description in which.

Figure 1:
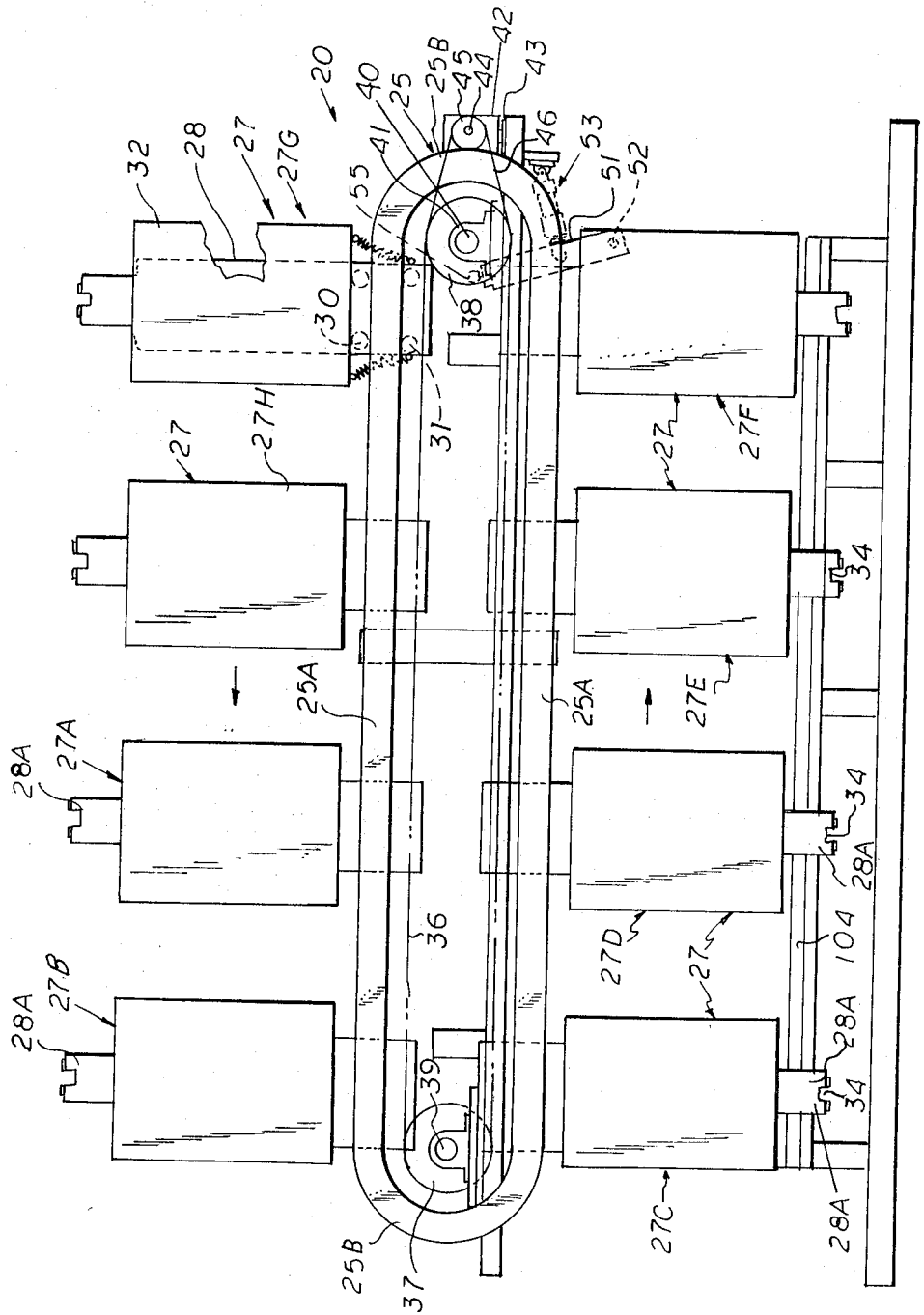
FIG. 1 is a generally diagrammatical plan or top view of a screen printing machine embodying the present invention in which the printing head assembly has been omitted.

Referring to the drawing there is shown therein a screen printing machine 20 which is particularly adapted for screen printing a plurality of separate and distinct articles, as for example, T shirts, towels, posters and the like. An important feature of the machine 20 is that the workpiece W to be printed is intermittently indexed from station to station about an oval track or rail 25 in which the workpieces are always maintained in a common horizontal plane as they are moved from station to station. As seen in FIGS. 1, 2, 5 and 6, the screen printing apparatus 20 embodying the present invention comprises a supporting frame means 21 comprised essentially of rectangularly disposed support legs 22 which are interconnected by longitudinally and transversely extending structural frame members 23 and 24. Mounted on top of the support frame structure 21 on suitable rail support members 26 is an oval track or rail 25. As best seen in FIG. 1 the oval track or rail 25 is defined by a tubular member having opposed substantially parallel side rail sections 25A-25A interconnected at the opposed ends thereof by a curved track section 25B. The rail sections 25A, 25B thus define a substantially oval shaped track or rail 25 which extends substantially the longitudinal length of the frame along one side thereof and wherein the plane of the oval track 25 is substantially horizontally disposed.

Figure 3:
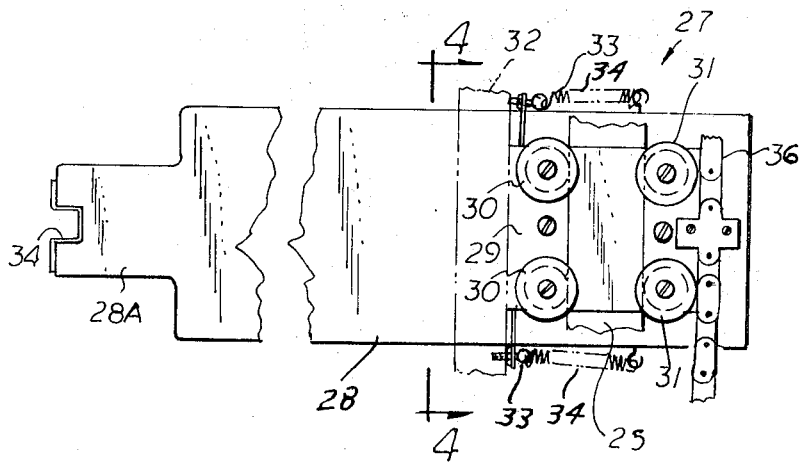
FIG. 3 is a detailed bottom plan view of a pallet construction utilized in the screen printing machine of FIGS. 1 and 2.
Figure 4:
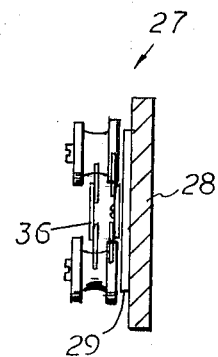
FIG. 4 is a sectional view taken along line 4—4 on FIG. 3.

A plurality of work supporting pallet means 27 are spaced about the oval rail 25. As best seen in FIGS. 3 and 4 each of the respective pallet means 27 comprises a base plate 28 which has connected to the undersurface thereof a subplate 29. Rotatably journalled to the subplate 29 are two pair of opposed guide rollers 30-30- and 31-31 arranged to straddle therebetween the tubular rail or track 25 whereby the respective pallets are maintained in rolling engagement with the track. As noted the rollers are flanged to compass the rail 25 and thereby support the pallet thereon.

Figure 2:
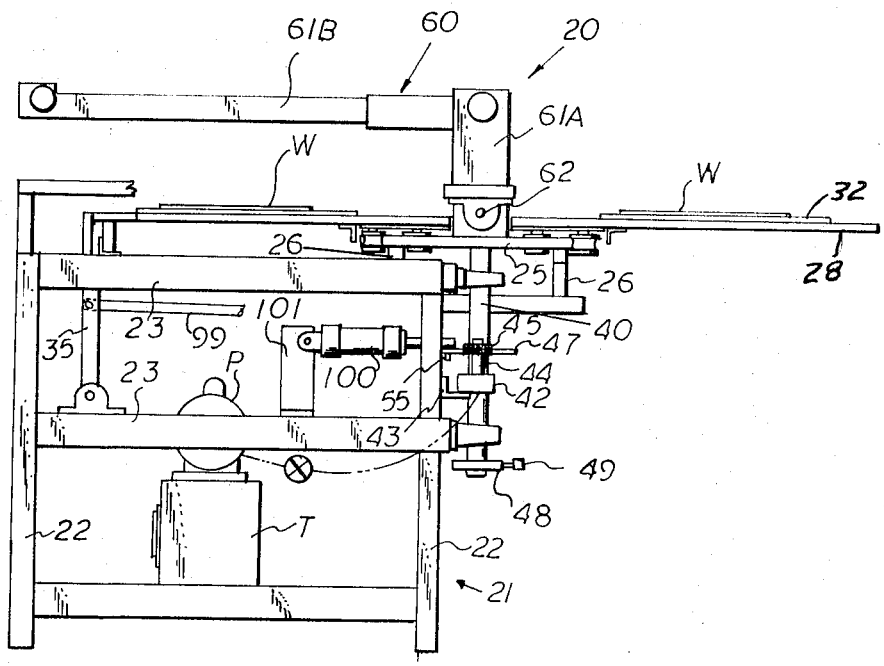
FIG. 2 is an end elevation view of FIG. 1 in which the printing head assembly is diagrammatically illustrated.

Detachably secured to the pallet base plate 28 is a work support plate 32. The work support plate 32 is slidably mounted on the pallet base plate 28 so that the work support plate 32 can be readily interchanged depending upon the nature and size of the workpiece W to be printed. Suitable latching means are provided for securing the work support plate 32 to the pallet base plate 28. In the illustrated form of the invention as best seen in FIG. 3, the latching means for detachably securing the work support plate 32 comprises a pair of hook and eye fasteners 33 which are maintained under spring tension, by means of latching springs 34 secured at one end to the side of the base plate 28. Accordingly the arrangement is such that by effecting disengagement of the hook and eye fastener 33, the work support plate 32 can be rendered readily removed with respect to the pallet base plate 28. As seen in FIGS. 1 and 2 respective pallets 27 are supported on the guide rail or track so as to extend outwardly therefrom. The free end of the respective pallet base plate 29 is provided with an extended reduced end portion 28A which has formed therein a notch 34 to accommodate a locating bar 35 to effect proper registration of the respective pallets 27 in the printing position as will be hereinafter described. As best seen in FIGS. 1 and 2 the oval track 25 enables the respective pallets 27 to be maintained in a common horizontal plane as they are indexed from station to station throughout the operating cycle of the machine as will be hereinafter described.

Figure 7:
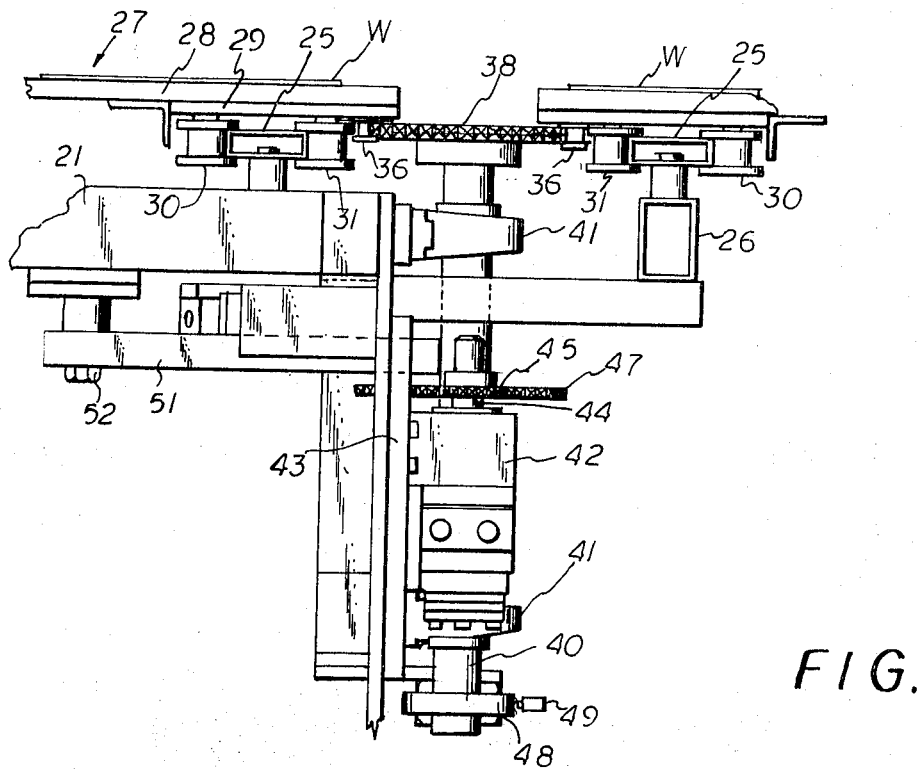
FIG. 7 is an enlarged detailed elevational view illustrating the drive and indexing means of the screen printing machine of FIGS. 1 and 2.
Figure 8:
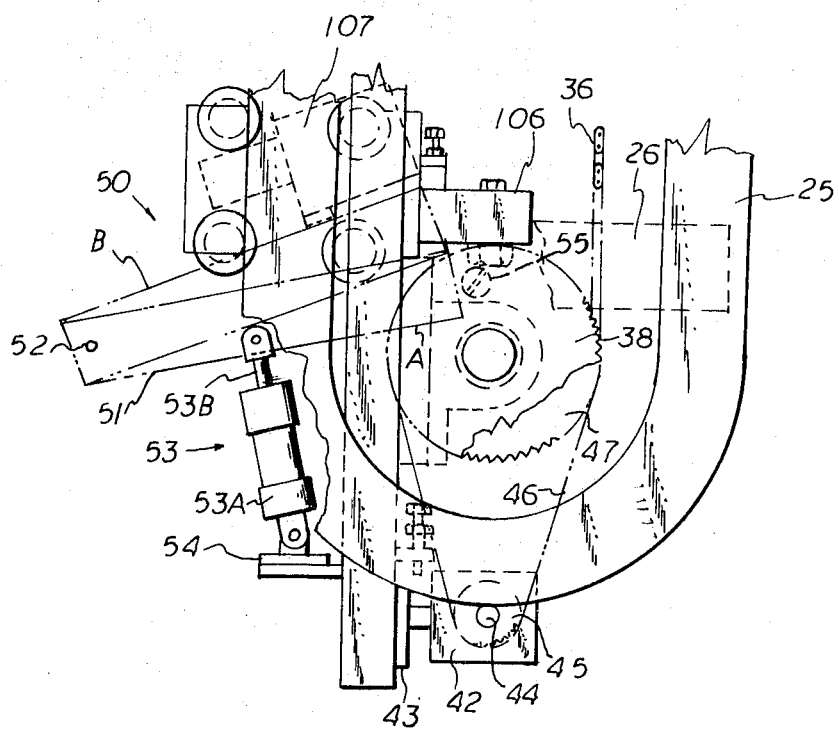
FIG. 8 is a plan view of the drive and indexing mechanism of FIG. 7.

The respective pallet means are interconnected by a flexible drive member 36 so that the individual pallets 27 may be indexed in unison about the endless rail or track 25. In the illustrated form of the invention the flexible interconnecting drive member comprises a chain 36 of the like which is suitably threaded about end sprockets 37 and 38 or pulleys which are rotatably journalled adjacent the opposed curved sections 25B, 25B of the oval track 25. Sprocket 37 is journalled about a jack shaft 38 suitably supported adjacent one end of the track 25. The other or driving sprocket 38 is journalled to a main drive shaft 40 which is rotatably supported in upper and lower bearings 41 mounted on the supporting frame structure of the machine as best seen in FIGS. 7 and 8. The arrangement is such that the flexible drive chain 36 interconnecting the respective pallets are suitably disposed in meshing relationship about the end sprockets 37 and 38 to effect the drive of the pallets about the rail 25.

The drive means for driving the chain 36 comprises a motor means 42 which is mounted to one side of the main drive shaft 40 on suitable bracket 43. In the illustrated form of the invention motor means 42 is illustrated as a fluid motor. However, it will be understood that other types of motor means may be utilized for effecting the drive of the respective pallets about the oval rail 25.

The output shaft 44 of the motor means 42 has connected thereto a sprocket 45 which is operatively connected in driving relationship by a flexible drive or chain 46 to a driven sprocket 47 journalled to the main drive shaft 40. It will be understood that whenever the motor means 42 is energized, drive sprocket 38 is driven in response thereto through the drive couplings 45, 46 and 47.

Connected to the lower end of the main drive shaft 40 to rotate therewith is a deceleration cam 48 which is adapted to be operatively associated with a suitable control, as for example, a micro switch 49 which is connected in the control circuit to effect a deceleration of the moving parts of the apparatus as will be hereinafter described.

An indexing means 50 is operatively associated with the motor drive means 42 so as to permit intermittent movement or drive of the respective pallets from station to station during machine operation. As best seen in FIGS. 7 and 8 the indexing means 50 comprises a ram stop lever 51 which is pivotally mounted at one end about a pivot 52 mounted on the machine supporting structure 21. An actuating means 53 in the form of a piston and cylinder assembly is operatively associated with the lever 51 to effect the movement thereof between operative and inoperative positions as seen in FIG. 8. The cylinder portion 53A of assembly 53 is pivotally mounted to a suitable bracket 54 mounted on a machine frame. The piston rod 53B of the piston and cylinder assembly 53 in turn is pivotally mounted to an intermediate portion of the ram stop lever 51. A cam follower stop 55 is connected to the driven sprocket 47 so that in operation whenever the ram stop lever 51 is disposed in an operative position as indicated in position A in FIG. 8, the ram stop lever is disposed so as to engage the cam stop follower 55 to prohibit rotation of the driven sprocket 47 and the drive of the pallets. When the piston and cylinder assembly 53 is actuated to extend the piston to a position B as indicated in FIG. 8, the ram stop lever 51 is moved away from the cam stop follower 55 thereby permitting the drive of the pallets to be actuated to advance the pallets 27 to the next succeeding station. The arrangement is such that after the driving sprocket 47 and pallets driven thereby have advanced a predetermined amount, the deceleration cam 48 actuates the microswitch 49 controlling through suitable valves the fluid to the fluid motor to effect a predetermined deceleration of the driving motor. As will be hereinafter described the control and operation of the motor drive means 42 is such as to effect an intermittent advance of the respective pallets from station to sation in accordance with a predetermined sequence or operating cycle.

In the illustrated form of the invention the fluid for activating the fluid drive motor 42 is contained in a reservoir or tank T mounted on the frame structure. Operatively connected to the source of fluid, e.g., hydraulic fluid, is a drive pump P which is operated by an electric motor 56.

Figure 5:
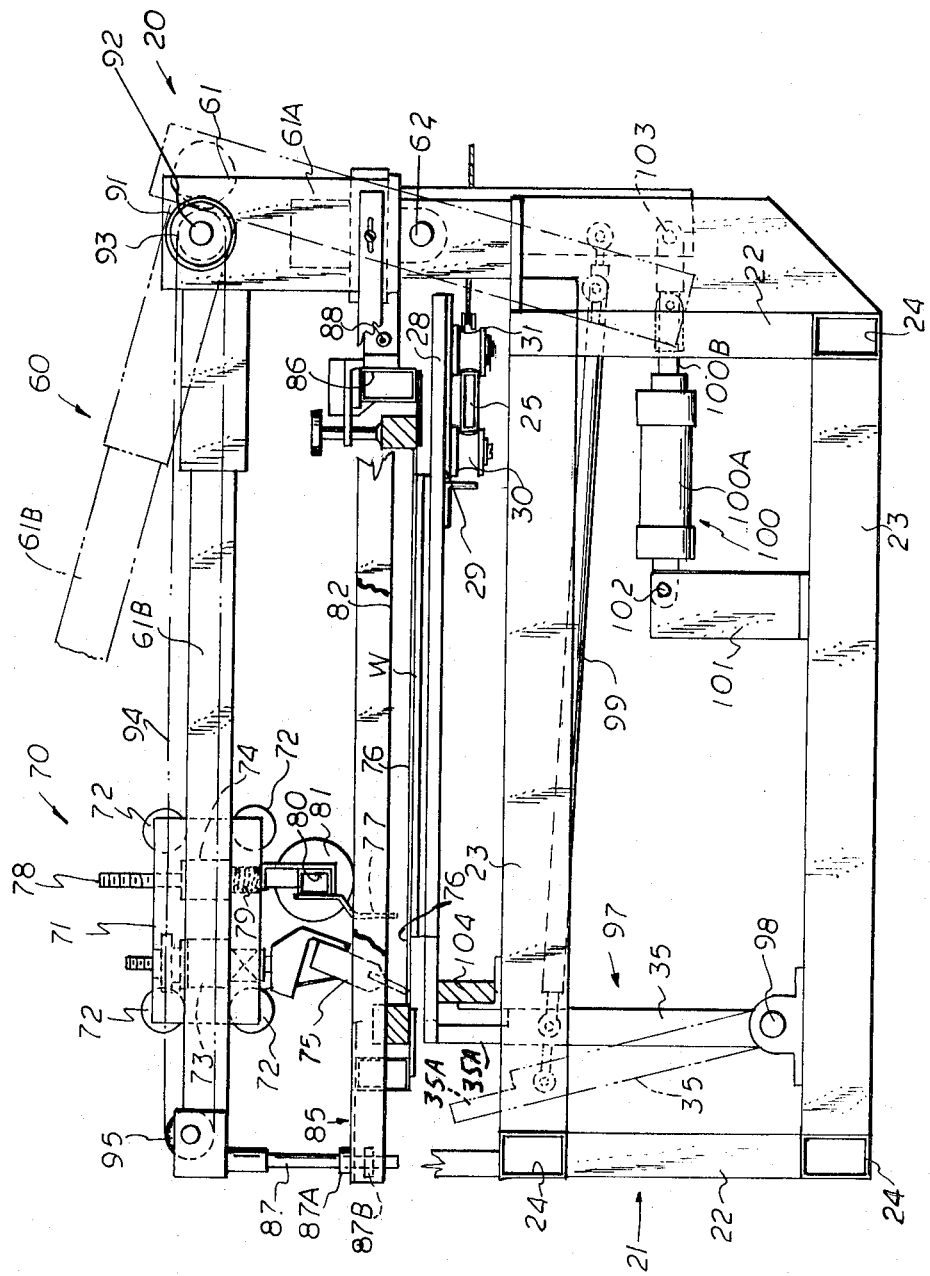
FIG. 5 is a detailed side elevation view of a fragmentary portion of the screen printing machine of FIGS. 1 and 2 in the solid line showing illustrating the printing head assembly in the operative printing position and in an inoperative non-printing position as indicated by the dotted line showing thereof.
Figure 6:
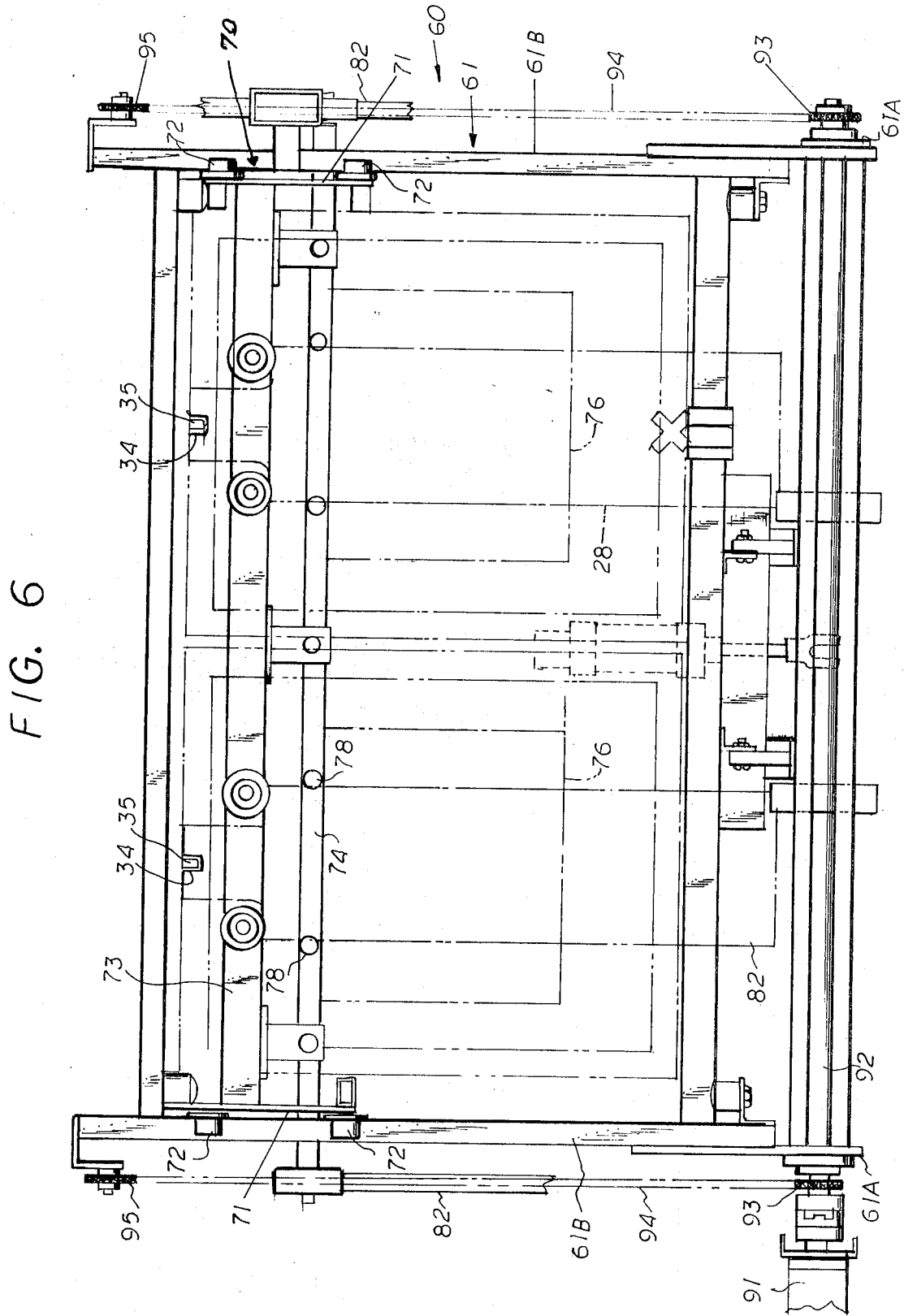
FIG. 6 is a plan view of the printing head assembly of FIG. 5.

To effect automatic screen printing of the workpiece W supported on the respective pallets, a printing head assembly 60 is mounted on the supporting frame structure 21 for movement between an operative, lowered printing position and an inoperative, raised, non-printing position. As best seen in FIGS. 5 and 6 the printing head assembly 60 comprises a printing head frame 61 which is pivotally mounted on the support frame structure 21 to pivot about pivot 62. The printing head frame 61 comprises a pair of opposed upright members 61A mounted to pivot about 62. Connected to the upper end of each of the pivoting uprights 61A-61A is a laterally extending side rail 61B, 61B. As best seen in FIGS. 5 and 6 the side rails 61B, 61B are disposed to extend to one side of the oval rail or track 25 and overlie one or more pallets 27. Mounted on the respective side rails 61B, 61B of the headframe is a squeegee carriage means 70. The carriage means comprises opposed carriage bodies 71-71 having journalled thereon guide rollers 72 arranged to straddle the respective side rails 61B to permit the carriage 70 to be in rolling engagement with the side rails 61B-61B. A transversely extending squeegee support bar 73 and a flood support bar 74 interconnect the respective carriage bodies. Spaced along the squeegee support bar 74 are one or more squeegees 75, depending upon the number of printing screens being used. Each squeegee 75 is adapted to be disposed in contact with an associated printing screen 76 to force the color therethrough during a screen printing operation. If desired one or more flooding parts 77 may be suspended from the flood support bar 74. As best seen in FIG. 5 the flood bar 77 is supported by a holder 78 which is normally biased by a spring 79 toward the printing screen 76. Interconnecting the respective flood bar holders is a cross bar 80 which has journalled to the ends thereof guide rollers 81. As best seen in FIG. 6 the respective guide rollers or wheels 81 are arranged to be disposed in rolling engagement with a bridge member 82 which extends transversely of the printing head along the opposed ends thereof. The arrangement is such that in the printing position of the apparatus, as seen in FIG. 5, the rolling engagement of the roller 81 on the bridge member is such as to compress or bias the flood bar spring 79 whereby the flood bars are spaced above the printing screen during the printing stroke of the squeegees 75.

A printing screen holder 85 is supported below the printing head frame 60 so as to provide for limited lost motion between the screen 76 and the squeegee 75 as the printing head 60 is moved between a printing and non-printing position. As best seen in FIG. 5, screen holder 85 comprises a rectangular frame structure 86 which is pivotally connected at one end to the support frame structure 21 of the machine about pivot 88. The other longitudinal side of the screen holder 85 is dependently supported by a connecting rod 87 from the free end of the head frame side rails 61B-61B. As seen in FIG. 5, a pair of spaced stops 87A, 87B are adjustably mounted on the connecting rod 87. The arrangement is such that as the printing head frame 60 is pivoted from a lowered operative position to a raised inoperative position, as seen in FIG. 5, the squeegee 75, which is fixed relative to the printing head frame 61, will move off the screen before the screen is caused to be lifted. This is attained by the spacing between the limit stops 87A, 87B connected to the connecting rod or link 87. In operation the printing head assembly 60 as it is initially moved to a raised inoperative position, as indicated by the dash dot line of FIG. 5, will effect the lifting of the front end of the screen 76 only after the squeegee 75 has been raised and when the lower limit stop 87B has engaged the screen holder 85. Continued movement of the head assembly 60 to its inoperative position causes the screen to pivot about pivot 88. In doing so, the flood rollers 81 are raised off the bridge member 82 whereby the tension of the flood spring 79 will cause the flood bar 77 to be lowered into engagement with the printing screen 76 to effect a flood stroke on the return of the squeegee carriage to its initial operating position.

A drive means 90 is provided for affecting the transversing stroke of the squeegee carriage to effect the printing and flooding strokes. As best seen in FIG. 6, the squeegee carriage drive means 90 comprises a motor, e.g., a reversible fluid motor 91 which is connected in driving relationship to a carriage drive shaft 92 extending transversely between the upright members 61A-61A of the printing head frame 60. Connected to the ends of the carriage drive shaft 92 is an end sprocket 93-93 about which a flexible drive means, as for example a chain 94 or the like, is threaded. The other end of the endless drive chain 94 is threaded about an idler sprocket 95 rotatably journalled on the forward end of the opposed side rails 61B-61B. The respective driving chains 94 are operatively connected to the carriage bodies 71 so that rotation of the drive shaft 92 in one direction or the other will effect a reciprocation of the squeegee carriage bodies 71 and associated squeegee bar and flood bar transversely of the printing screen to alternately effect the printing and flooding stroke during the machine cycle of operation.

To effect a proper registration of the respective pallets when they have been indexed to the screen printing station beneath the printing head assembly 60, a registration means 97 is cooperatively associated with the printing head assembly 20 to effect registration of the pallet with the printing screen. As best seen in FIG. 5 the registration means 97 comprises a locating bar 35 which is pivotally mounted to the machine frame about pivot 98 fixed to the supporting structure. A connecting link 99 interconnects the locating bar 35 with the pivoting uprights 61A of the head frame 60. The arrangement is such that whenever the printing head 60 is disposed in an operative printing position, the locating bar 35 is pivoted so that its upper end 35A engages the registration notch 34 formed in the extended end of the pallet. Whenever the printing head 60 is moved out of printing position or to a raised position as indicated in FIG. 5, the locating bar is pivoted away from the pallet to effect disengagement thereof from the registering notch 34 and enabling the pallets to be indexed to the next succeeding position. It will be understood that one or more locating bars are coupled to operate in unison depending upon the number of pallets that are being printed. Also the printing head 60 may be sized to hold one or more screens depending upon the number of colors being printed.

As seen in FIG. 5, an actuating means in the form of a piston and cylinder assembly 100 is provided for effecting the actuation of the printing head 60 between a printing and non-printing position. As illustrated, the cylinder 100A of the actuating means 100 is pivotally connected to a suitable support 101 mounted on the support structure about pivot 102. The piston rod 100B of the assembly 100, is pivotally connected to the pivoting upright 61A of the head assembly about pivot 103. Accordingly whenever the piston and cylinder assembly 100 is actuated, the printing head is pivoted between an operative printing position and an inoperative non-printing position with the registration means 97 responding accordingly.

With the arrangement described it will be apparent that the respective pallets 27 are disposed in a horizontal plane whereby they are indexed and maintained in a common plane at all times. Thus the respective pallets 27 are exposed so that each is rendered readily usable as an operating station; thereby providing a minimum number of pallets for a given machine without adversely affecting the production and/or speed of operation.

In the illustrated form of the invention eight such pallets are illustrated whereby the pallets at two stations, as for example stations 27A and 27B may be utilized for loading the workpiece thereat and whereby the next four succeeding pallets located at the printing stations 27C-27F may effect a four color printing of the workpiece, and whereby the other two pallets located at stations 27G and 27H may be utilized to effect the removal of the workpiece therefrom. By providing a machine with a minimum number of pallets, the overall size and structue of the machine is greatly reduced, and thereby results in a maximum saving of initial capital expenditure. The machine described enables maximum production with a minimal amount of effort, capital and labor. Because of the proximity of the feeding stations 27A, 27B and take off stations 27G and 27H disposed on the same side of the machine, the arrangement is such that it can be operated at reasonable speed by a single operator. Also the apparatus enables the printing to be accomplished with one or more colors in a readily simple, efficient and expedient manner wherein all the printing is performed on the same side of the machine to further simplify the machine structure and wherein the feeding and unloading of the machine can be readily effected on the opposite side of the machine.

To support the free end of the pallets 27 in the printing stations of the machine, a support rail 104 is provided. As best seen in FIG. 5, the support rail 104 extends along the machine frame structure so as to support the reduced end portion 28A of the respective pallets 27 when the pallets have been indexed into the printing position beneath the printing head 60.

Figure 9:
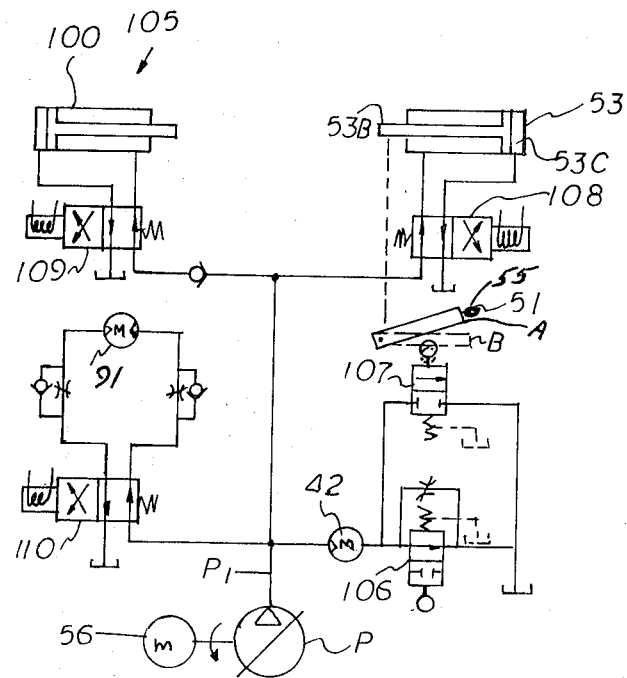
FIG. 9 is a schematic diagram of the control circuit for sequencing the operating components of the machine.

FIG. 9 illustrates a schematic diagram of the control circuit 105 by which the component parts of the machine are sequenced during the machine operating cycle. As shown the fluid pump P for maintaining fluid pressure is activated by an electric motor 56. Connected in parallel to the output side P1 of the pump P is the index drive motor 42, the ram stop actuating piston and cylinder assembly 53, the printing head piston and cylinder actuating assembly 100, and the reverse motor means 91 for actuating the squeegee carriage means 70. Connected in series with the index motor means 42 and in parallel with respect to each other is a normally opened deceleration valve 106 and a normally closed by-pass valve 107.

Operatively associated with a normally closed by-pass valve 107 is a ram stop lever 51 which is mechanically linked to the piston rod 53B of the ram stop piston and cylinder actuating means 53. A solenoid actuated control valve means 108 is operatively connected to the ram stop piston and cylinder assembly 55 to control the flow of fluid thereto and accordingly the operation thereof.

A similar solenoid actuated valve 109 is operatively connected to the actuating piston and cylinder 100 to sequence the operation of the printing head 60. Also a solenoid valve 110 is operatively connected to the squeegee drive motor 91 to effect the proper sequencing of the motor drive so as to activate the squeegee and flood bars. The respective solenoid valves 108, 109 and 110 are of the type that are activated when a timed impulse is imparted thereto. The timing of the actuation of the respective solenoid valves 108, 109 and 110 to sequence the various machine operations is effected by a suitable timer operating a series of cams for imparting a timed impulse to a switch means to operate the respective solenoid valves in accordance to a predetermined program.

Accordingly the operation of the machine is as follows:

In the non-printing position of the apparatus and in the at rest position, the printing head assembly 60 is normally in the raised inoperative position as shown in the dotted or phantom line showing on FIG. 5. In this position of rest, the by-pass valve 107 is normally closed and the deceleration valve 106 is normally opened. The energizing of the electric motor 56 effects operation of the pump P to maintain a fluid pressure on the system whereby the ram stop piston and cylinder assembly 55 holds the ram lever 51 in position A to prohibit indexing of the pallets, and the head activating piston and cylinder assembly 100 holds the head frame 60 in the raised position. Upon an impulse or signal generated by a suitable timer being imparted to the solenoid valve 108 controlling the fluid flow to piston and cylinder assembly 53, the valve 108 is shifted causing the fluid to flow to chamber 53C to advance the piston rod 53B. In doing so the ram lever 51 coupled thereto is moved toward postion B, causing the ram lever 51 to open the by-pass valve 107, thereby permitting the motor drive 42 to index the pallets about the oval track 25. Upon rotation of the main drive shaft 40 through a predetermined angular degree of rotation, the deceleration cam coupled thereto exerts an influence on the deceleration valve causing the machine to decelerate as the pallets reach the respective succeeding stations.

With the pallets indexed, an impulse from a timer is supplied to the solenoid valve 109 controlling the actuation of the head frame activating piston and cylinder assembly 100 causing the head frame 60 to be lowered into a printing position. As the printing head 60 is being lowered to printing position the locating bars 35 coupled thereto are moved into registration with the notches 34 of the respective pallets to insure proper registration of the pallets relative to the screen 76, in the printing position. As the printing head frame lowers, the printing screen 76 supported thereon is moved into printing position over the workpiece W supported on the pallet thereunder.

As the printing head 60 is being lowered, the carriage 71 is moved to transverse the flood stroke. As the head 60 reaches printing position the flood bar roller 81 engages the bridge member 82 causing the flood bar 77 to be moved out of engagement with the screen 76 supported on the screen holder. When the head is lowered, the squeegee is engaged with the screen in preparation to effecting the printing stroke. With the squeegee in engagement with the printing screen, an impulse is imparted to the solenoid valve 110 to reverse the operation of the squeegee drive motor 91 to traverse a printing stroke relative to the screen and thereby force the color through the screen and onto the workpiece W.

Upon completion of the printing operation an impulse is again imparted to the solenoid 109 controlling the head activated piston and cylinder assembly 100 to reverse the stroke of the piston causing the printing head 60 to be raised to an inoperative position. Upon the initial movement of the head frame 60 to the raised position, the squeegee 75 is first lifted off the screen 76, before the screen is lifted due to the lost motion resulting therebetween. Upon continued movement of the head frame to raised position, the lower stop 87B engages the screen holder 85 causing the same to be raised with the head frame 60, the other end of the screen holder pivoting about pivot 88. As the printing head is lifted, the flood roller 81 is raised off bridge member 82 causing the springs 79 to bias the flood bar 77 toward the screen whereby a flood stroke is effected upon the return of the squeegee carriage 71 to its initial position upon a reversal of motor 91. With the printing head 60 in the inoperative position the locating bars 35 are retracted or moved free of the notches 34 whereby the pallets may be again indexed to repeat the cycle of operation.

From the foregoing it will be apparent that the number of pallets necessary to effect a screen print on a series of independent articles at optimum production speed is reduced to a minimum inasmuch as all of the pallets are disposed in a common plane whereby the various functions of feeding, printing and removing of the printed article can be readily achieved in a manner whereby all of the pallets can be effectively utilized as operating stations through the entire printing cycle of the apparatus. Therefore the number of pallets required to produce a given number of units per unit of time is at least half of that heretofore required to achieve the same or comparable production.

While the instant invention has been described with respect to a particular embodiment thereof it will be readily understood and appreciated that variations and modifications of the invention may be made without departing from the spirit or scope thereof.

What is claimed is:

1. A screen printing machine comprising:
   a supporting frame means,
   an oval shaped rail mounted on said frame,
   a plurality of pallet means disposed in a common plane circumferentially spaced about said oval rail,
   drive means operatively interconnecting said pallet for indexing said pallets about said oval rail in said common plane, and
   a printing head means mounted on said frame means for movement between an operative printing position and an inoperative non-printing position,
   indexing means connected to said drive means for indexing said pallets about said oval rail,
   said indexing means including a ram stop means,
   a ram stop cam follower operatively associated with said drive means,
   and an activating means for moving said ram stop means into and out of operative position relative to said cam follower to effect the indexing of said pallets about said oval rail.

2. The invention as defined in claim 1 wherein said printing head means includes:
   a head frame pivotally mounted to said supporting frame means,
   a carriage movably mounted on said head frame,
   a squeegee means mounted on said carriage,
   a screen holder disposed below said carriage and squeegee means mounted thereon,
   said screen holder having one end pivotally mounted to said support frame means, and
   a connecting link supporting the other end of said screen holder from said head frame,
   and means on said link connected end for effecting a predetermined amount of lost motion between said head frame and carriage mounted thereon, and said screen holder as said printing head is pivoted between an operative printing position to an inoperative non-printing position.

3. The invention as defined in claim 2 and including:
   a flood bar mounted on said carriage,
   means for normally biasing said flood bar toward operative flooding position in the non-printing position of said head means, and
   means for overcoming said bias on said flood bar in the printing position of said head.

4. The invention as defined in claim 1 wherein said interconnecting drive means including:
   an endless flexible member,
   said pallets being connected to saiid endless flexible member at spaced intervals therealong, and
   a means for effecting the drive of said endless flexible member.

5. The invention as defined in claim 4 wherein said drive means comprises:
a drive shaft having a driving sprocket connected thereto,
said flexible member being threaded about said driving sprocket,
a motor means operatively connected to said drive shaft to effect the drive thereof.

6. A screen printing machine comprising:
a supporting frame means,
an oval shaped rail mounted on said frame,
a plurality of pallet means disposed in a common plane circumferentially spaced about said oval rail,
means operatively interconnecting said pallet means for indexing said pallet means about said oval rail in said common plane,
a printing head means mounted on said frame means for movement between an operative printing position and an inoperative non-printing position,
said interconnecting means including an endless flexible member,
said pallet means being connected to said endless flexible member at spaced intervals therealong,
a drive means for effecting the drive of said endless flexible member,
and indexing means operatively connected to said drive means for indexing said pallet means from station to station about said oval rail,
said indexing means including:
a ram stop means,
a ram stop cam follower operatively associated with said drive shaft to rotate therewith,
and an activating means for moving said ram means stop into and out of operative position relative to said cam follower to effect the indexing of said pallet means about said oval rail.

7. The invention as defined in claim 4 and including registration means operative to register said pallet in the printing position.

8. The invention as defined in claim 7 wherein said registration means are operatively associated with said printing head so that said registration means are rendered operative when said head is disposed in printing position.

9. A screen printing machine comprising:
a supporting frame,
an oval shaped rail mounted on said supporting frame whereby the plane of said oval rail is substantially horizontally disposed,
a sprocket rotatably journalled adjacent each end of said oval shaped rail,
an endless flexible driving chain threaded about said sprocket,
a plurality of pallets connected to said chain at spaced intervals therealong,
guide rollers connected to each of said pallets, said guide means being disposed in rolling engagement with said oval rail,
a drive means operatively connected to one of said sprockets to effect the drive thereof, whereby said pallets are moved in a common plane about said oval rail, indexing means operatively associated with said drive means for indexing said pallets about said oval track,
said indexing means including a ram stop means,
a ram stop cam follower operatively associated with said drive means,
and an activating means for moving said ram stop means into and out of operative position relative to said cam follower to effect the indexing of said pallets about said oval rail,
a printing head assembly mounted on said supporting frame for moving between an operative printing position and an inoperative non-printing position, and
a registration means operatively associated with said printing head means,
said registration means operating on said pallets to effect accurate registration of said pallets with said printing head assembly in the operative printing position thereof.

10. A screen printing machine comprising:
a supporting frame means,
an oval rail mounted on said frame means whereby the plane of said oval rail is substantially horizontally disposed,
a sprocket rotatably journalled on said supporting frame adjacent each end of said oval rail,
an endless flexible driving chain threaded about said sprocket,
a plurality of pallets connected to said chain at spaced intervals thereabout, said pallet having a locating means on one end thereof,
guide rollers connected to each of said pallets, said guide rollers being disposed in rolling engagement with said rail,
a drive means including:
a drive shaft connected to one of said sprockets,
a motor means having an output shaft,
a second sprocket mounted on said drive shaft,
a flexible driving member coupling said motor shaft to said second sprocket to effect the drive of said drive shaft when said motor means is activated,
an indexing means including:
a ram stop cam follower connected to said second sprocket,
a ram stop pivotally mounted on said frame for movement into and out of engagement relative to said cam follower,
a ram stop activating means operatively connected to said ram stop to effect actuation of said ram stop,
means responsive to the actuation of said ram stop for effecting the actuation of said motor means,
a printing head assembly mounted on said frame for movement between a printing and non-printing position,
said printing head assembly including a head frame pivotally mounted on said support frame means,
said head frame including opposed side rails,
a carriage mounted on said side rails,
a carriage drive means for traversing said carriage along said side rails,
a squeegee means supported on said carriage,
a screen holder adapted to support a printing screen disposed below said squeegee,
said screen holder being pivotally mounted to said supporting frame means adjacent one end thereof,
an interconnecting link supporting the other end of said screen holder to said head frame,
said interconnecting link including means for effecting a predetermined amount of lost motion between said head frame and said screen holder as said printing head assembly moves between a printing and non-printing position, and a registration means for accurately positioning said pallet in the printing position, said registration means including a locating bar pivotally mounted on said supporting frame, and a linkage means interconnecting said locating bar to said head frame whereby said locating bar is moved into registration with the locating means of said pallet in the printing position of said head assembly and out of registration with the locating means of said pallet in the non-printing position of said head assembly.

11. The invention as defined in claim 10 and including a flood movably mounted on said carriage, a spring means for normally biasing said flood bar toward a printing screen, and means operatively connected to said flood bar for overcoming the bias of said spring in the printing position of said head assembly.

12. The invention as defined in claim 11 wherein said latter means includes a flood roller connected to said flood bar, a flood bar bridge supported below said head side rails, said flood roller being disposed in rolling engagement with said bridge in the printing position of said head assembly for maintaining the associated flood bar off the printing screen in the printing position.

* * * * *